United States Patent

Krogerus et al.

(10) Patent No.: US 9,359,655 B2
(45) Date of Patent: Jun. 7, 2016

(54) METALLURGICAL COMPOSITION FOR THE MANUFACTURE OF FERROCHROME

(75) Inventors: Helge Krogerus, Pori (FI); Pasi Mäkelä, Pori (FI)

(73) Assignee: Outotec Oyj, Espoo (FI)

( * ) Notice: Subject to any disclaimer, the term of this patent is extended or adjusted under 35 U.S.C. 154(b) by 132 days.

(21) Appl. No.: 14/358,619

(22) PCT Filed: Nov. 15, 2011

(86) PCT No.: PCT/EP2011/070134
§ 371 (c)(1),
(2), (4) Date: May 15, 2014

(87) PCT Pub. No.: WO2013/071956
PCT Pub. Date: May 23, 2013

(65) Prior Publication Data
US 2015/0013496 A1 Jan. 15, 2015

(51) Int. Cl.
C22B 1/24 (2006.01)
C22C 1/00 (2006.01)
C22B 1/16 (2006.01)
C22B 9/00 (2006.01)
C22C 38/18 (2006.01)
C22C 27/06 (2006.01)
C21C 5/52 (2006.01)
C22B 5/06 (2006.01)

(52) U.S. Cl.
CPC ............ *C22B 1/2406* (2013.01); *C21C 5/5264* (2013.01); *C22B 1/16* (2013.01); *C22B 5/06* (2013.01); *C22B 9/00* (2013.01); *C22C 1/00* (2013.01); *C22C 27/06* (2013.01); *C22C 38/18* (2013.01); *Y02P 10/216* (2015.11)

(58) Field of Classification Search
CPC ........ C21C 5/5264; C22C 1/00; C22C 38/18; C22B 1/2406; C22B 5/06; C22B 1/16
See application file for complete search history.

(56) References Cited

U.S. PATENT DOCUMENTS

| 906,854 | A | * | 12/1908 | Becket | ...................... C21C 7/00 420/428 |
| 4,576,637 | A | | 3/1986 | Tamas et al. | |
| 4,659,374 | A | * | 4/1987 | Alanko | .................... C22B 5/10 420/478 |

FOREIGN PATENT DOCUMENTS

| CN | 1426487 A | 6/2003 |
| CN | 100352950 C | 12/2007 |
| CN | 101705333 B | 5/2010 |
| EP | 1274870 B1 | 1/2005 |

OTHER PUBLICATIONS

Derwent Acc No. 1976-01497X for the patent family including SU 467947 A published Apr. 15, 1975.*
State Intellectual Property Office of the Peolpe's Republic of China, office action issued in application No. 201180074859.1, Feb. 3, 2015, Beijing, China.
International Search Report and Written Opinion, PCT/EP2011/070134, Outotec Oyj, dated Jan. 27, 2012, 10 pgs.
Abdulabekov E.E. et al., "Production of Chromite Pellets for Smelting High-Carbon Ferrochromium," Steel in Translation, vol. 33, No. 5, pp. 25-28, 2003.

* cited by examiner

*Primary Examiner* — George Wyszomierski
*Assistant Examiner* — Tima M McGuthry Banks
(74) *Attorney, Agent, or Firm* — Chernoff, Vilhauer, McClung & Stenzel, LLP

(57) ABSTRACT

The invention relates to a pelletizing feed containing chromite ore, at least one nickel salt, and silicon carbide as the only carbonaceous material and the only reducing agent. The invention also relates to process for manufacturing the pelletizing feed comprising the steps providing chromite, at least one nickel salt and silicon carbide, and mixing chromite, at least one nickel salt and silicon carbide. The invention also relates to use of the pelletizing feed as a starting material for the manufacture of sintering feed. The invention also relates to a sintering feed in the form of pellets containing the pelletizing feed. The invention also relates to sintered pellets containing the sintering feed. The invention also relates to process for manufacturing the sintered pellets. The invention also relates to use of the sintered pellets as a component of smelting feed. The invention also relates to smelting feed comprising sintered pellets. The invention also relates to process for manufacturing ferrochrome alloy. The invention also relates to ferrochrome alloy obtainable by the method.

16 Claims, No Drawings

METALLURGICAL COMPOSITION FOR THE MANUFACTURE OF FERROCHROME

CROSS-REFERENCE TO RELATED APPLICATIONS

This is a national stage application filed under 35 USC 371 based on International Application No. PCT/EP2011/070134 filed Nov. 15, 2011.

The invention relates to metallurgical compositions such as pelletising feed, sintering feed, sintered pellets and smelting feed comprising chromite, nickel salt and silicon carbide. Further, the invention relates to methods for the manufacture of said compositions. The smelting feed according to the invention is used for the manufacture of ferrochrome alloy, preferably ferrochromium nickel alloy.

Silicon carbide is frequently used as a reducing agent which can be employed in metallurgical processes such as smelting.

EP 1 274 870 B1 relates to a smelting process, wherein ferrochrome alloy is manufactured by adding carbide to material containing chromium and iron as oxides.

U.S. Pat. No. 4,576,637 relates to a process for the preparation of alloys from pellets. The pellets comprise oxide, carbonaceous reducing agent and/or carbides.

Object of the present invention is to provide metallurgical compositions and methods for their manufacture that improve and facilitate the manufacture of ferrochrome alloy, preferably ferrochromium nickel alloy.

A first aspect of the invention relates to a pelletising feed containing a) chromite, b) a nickel salt, and c) silicon carbide as the only carbonaceous material and the only reducing agent.

It has been surprisingly found that the presence of silicon carbide in green pellets (sintering feed) according to the invention is advantageous for the manufacture of the corresponding sintered pellets (sintering process) and the manufacture of the corresponding alloys (smelting process).

During sintering, a slight oxidation of silicon carbide generates energy inside the pellets (exothermic reactions: $C \rightarrow CO_2$ and $Si \rightarrow SiO_2$) and, therefore, no addition of carbon is needed for the sintering process. In other words, no extra carbon is needed in the pellets when silicon carbide is used. The amount of fuel (e.g., butane) used for sintering is much lower due to the occurrence of said exothermic reactions. Further, the metallisation of iron is low (usually less than 4%) and in particular the reduction of chromium during sintering is negligible. Hence, the utilisation of chromite ore is improved and energy consumption is decreases which saves natural resources (ore, fuel and energy). It should be also emphasised that the compressive strength of sintered pellets was on average higher than the pellets without silicon carbide. Even further, the loss of silicon carbide is small during the sintering process. Therefore, silicon carbide is still left in the sintered pellets; said unused silicon carbide supports reduction processes during smelting.

By the use of silicon carbide, high grade sintered pellets are produced which display good smelting characteristics. The chromium content of slag in the smelting of the sintered pellets without silicon carbide is much higher compared to that of the silicon carbide pellets. Thus, the presence of silicon carbide in the sintered pellets decreases the chromium content in slag. Further, the recovery of chromium and iron was considerably higher when the pellets with silicon carbide were used. As outlined here above, the oxidation of silicon carbide is exothermic (energy is released). Hence, less external reducing agent such as coke or metallurgical coke is needed for smelting. Therefore, less fossil fuel is needed and the consumption of natural resources is reduced. Further, the presence of silicon carbide increases the electrical resistance in the smelting feed, which in turn decreases the consumption of electric energy which in turn saves raw materials.

Further, it has been found that the total porosity of pellets containing nickel salts such as nickel hydroxide/nickel oxide is very high compared to that of pellets without nickel salts. This increased porosity improves the reducibility of the sintered pellets. It has been observed that good quality sintered pellets can be produced with the addition of ca. 20 wt-% nickel salts such as nickel hydroxide/nickel oxide. The addition of nickel salts to pellets has a very positive effect on the metallisation degree of chromium as observed by a higher chromium recovery in the ferrochrome smelting process; and also the recovery of nickel is high.

Even further, it has been found that the presence of silicon carbide and nickel salts such as nickel hydroxide/nickel oxide results in synergistic effects with respect to a higher recovery of iron, chromium and nickel, and decreased energy consumption during sintering and smelting. We assume that the exothermic reactions provided by silicon carbide and the increased porosity provided by nickel salts leads to said synergistic effects.

For the purpose of this description, the terms "ferrochrome alloy", "ferrochromium nickel alloy" and "silicon carbide" are abbreviated as "FeCr", "FeCrNi" and "SiC", respectively.

The invention relates preferably to a pelletising feed containing a) chromite as the only metal ore, b) a nickel salt, and c) silicon carbide as the only carbonaceous material and the only reducing agent.

For the purpose of this description, the term "silicon carbide as the only carbonaceous material" means that the pelletising feed according to the invention contains silicon carbide as the only source of carbon; in other words, the pelletising feed according to the invention does not contain any other carbonaceous material but silicon carbide. Similarly, the term "silicon carbide as the only reducing agent" means that silicon carbide is the only reducing agent in the pelletising feed according to the invention; in other words, the pelletising feed according to the invention does not contain any other reducing agent but silicon carbide. Further, the term "carbonaceous material" stands for any compound serving as a source of elemental carbon which can undergo oxidation to carbon dioxide in metallurgical processes such as smelting. Typical examples for carbonaceous material are carbides, char, coal, and anthracite. For the purpose of this description, the term "chromite as the only metal ore" means that chromite is the only metal ore in the pelletising feed according to the invention; in other words, the pelletising feed according to the invention does not contain any other metal ore but chromite. Further, the term "pelletising feed" stands for a solid mixture which serves as starting material (raw material) for the manufacture of pellets in the pelletising plant; the obtained pellets are subsequently processed in a sintering plant to produce sintered pellets which in turn serve as starting material for the smelting process to obtain FeCr, preferably FeCrNi.

Preferably, the pelletising feed according to the invention consists of a) chromite as the only metal ore, b) at least one nickel salt, c) silicon carbide as the only carbonaceous material and the only reducing agent, and d) binding agent.

With respect to the pelletising feed according to the invention, the term "consist of" means that the pelletising feed consists of the mentioned components only and, hence, the presence of any additional component is excluded. In other words, the percentages of the components a), b), c), and d) add up to 100%.

Preferably, the pelletising feed according to the invention is a solid mixture such as a ground powder.

The nickel salt is preferably a solid composition which contains a nickel salt such as nickel hydroxide, nickel oxide, or nickel sulphide, or any mixture of nickel salts. A preferred nickel salt is a solid composition containing nickel hydroxide and nickel oxide as main components. In another preferred embodiment, the nickel salt is preferably a solid composition which contains nickel hydroxide as main component. In yet another preferred embodiment, the nickel salt is nickel hydroxide. In yet another preferred embodiment, the pelletising feed according to the invention contains only one nickel salt, preferably nickel hydroxide, nickel oxide or nickel sulphide.

The pelletising feed according to the invention contains preferably 0.1 to 25 wt-% nickel salt, more preferably 1 to 24 wt-% nickel salt, even more preferably 2 to 23 wt-% nickel salt, most preferably 3 to 22 wt-%, and in particular 4 to 21 wt-%.

In another embodiment, the pelletising feed according to the invention contains preferably 20±5 wt-% nickel salt, more preferably 20±4 wt-% nickel salt, even more preferably 20±3 wt-% nickel salt, most preferably 20±2 wt-% nickel salt, and in particular 20±1 wt-% nickel salt.

The pelletising feed according to the invention contains preferably 4-20 wt-% SiC, more preferably 4-15 wt-% SiC, even more preferably 4-7 wt-% SiC, most preferably 4-6.5 wt-% SiC, and in particular 6±0.5 wt-% SiC. Typically, the pelletising feed according to the invention contains 6 wt-% SiC.

The pelletising feed according to the invention may contain fluxing agents, such as limestone, dolomite, quarts, quartzite, calcite or wollastonite or any mixture thereof. The fluxing agents quartzite or calcite or any mixture thereof are preferably used. In a preferred embodiment, the pelletising feed does not contain any fluxing agent and, hence, the smelting feed and sintered pellets according to the invention do not contain any fluxing agent either. In this case, suitable fluxing agents may be added to obtain the respective smelting feed (see below).

Preferably, the pelletising feed according to the invention contains binding agent. The binding agent is preferably bentonite, in particular activated bentonite such as sodium-activated calcium bentonite.

The pelletising feed according to the invention contains preferably 0.5-3 wt-%, more preferably 0.75-2.5 wt-%, even more preferably 1-2 wt-%, most preferably 1.2±0.3 wt-% and in particular 1.2 wt-% binding agent such as bentonite or sodium-activated calcium bentonite.

The water absorption capacity of the bentonite such as sodium-activated calcium bentonite is preferably 500-750%, more preferably 550-700%, and even more preferably 600-650%.

The average particle size of the bentonite such as sodium-activated calcium bentonite is preferably 2.5-5 µm (d50%), more preferably 3-4 µm (d50%), even more preferably 3.7±0.5 µm (d50%), and most preferably 3.7 µm (d50%).

The specific surface area of the bentonite such as sodium-activated bentonite is preferably 20-30 m²/g, more preferably 24-27 m²/g, even more preferably 26±0.3 m²/g, and most preferably 25.9 m²/g.

The binding agent such as bentonite or sodium-activated calcium bentonite displays a loss of ignition of preferably 7-13%, more preferably 10-11.5%, and even more preferably 10.8%.

Preferably, the chromite, nickel salt (e.g. nickel hydroxide, nickel oxide, nickel sulphide) and SiC have a particle size distribution of 60-90% below 200 mesh, more preferably 75-85% below 200 mesh, and even more preferably 80% below 200 mesh.

SiC has a particle size distribution of preferably 70-80% below 74 µm, more preferably 75±2% below 74 µm, and even more preferably 75% below 74 µm. In another preferred embodiment, SiC has a particle size distribution of preferably 70-80% below 74 µm and 40-60% below 37 µm, more preferably 75±2% below 74 µm and 45 to 55% below 37 µm, and even more preferably 75% below 74 µm and 50% below 37 µm.

Chromite has a particle size distribution of preferably 70-90% below 74 µm, more preferably 75-90% below 74 µm, even more preferably 79-85% below 74 µm. In another preferred embodiment, chromite has a particle size distribution of preferably 70-90% below 74 µm and 40-60% below 37 µm, more preferably 75-90% below 74 µm and 45 to 55% below 37 µm, and even more preferably 79-85% below 74 µm and 47-54% below 37 µm.

The invention further relates to a process for manufacturing the pelletising feed according to the invention comprising the steps
  providing chromite, a nickel salt, and silicon carbide, and
  mixing said components.

In a preferred embodiment, the invention further relates to a process for manufacturing the pelletising feed according to the invention comprising the steps
  providing chromite, a nickel salt, binding agent and silicon carbide, and
  mixing said components.

Preferably, the chromite is in the form of a chromite concentrate from a beneficiation plant. In a preferred embodiment, chromite is the only metal ore provided; i.e., no other metal ore is added to the process mixtures and pelletising feed. In another preferred embodiment, the only carbonaceous material and reducing agent added to the process mixture and pelletising feed is silicon carbide; i.e., no other carbonaceous material such as coal, char or anthracite is added to the process mixtures and pelletising feed.

Preferably, each feed material—i.e. the silicon carbide, nickel salt, binding agent, chromite, and optionally fluxing agent—is added individually in order to achieve an optimal homogenisation of the process mixtures.

In a preferred embodiment, the mixing of components takes place before, during or after a grinding step.

Preferably, the silicon carbide is dosed in relation to the chromite or chromite concentrate. Typically, silicon carbide and nickel salt are fed to the chromite before grinding and, hence, the chromite, nickel salt and silicon carbide are preferably ground together. Feeding the silicon carbide and the nickel salt before the grinding is advantageous for the sintering process because in this way the silicon carbide and the nickel salt are most evenly spread in the obtained pellets. However, the grinding of the single components can also be carried out separately, and the separately ground components are preferably mixed with each other after grinding. It is also possible, to grind any mixture of the components and/or any single component separately, and the separately ground mixtures and/or single components are preferably mixed with each other after grinding.

Depending on the particle size distribution of the binding agent, the binding agent such as bentonite or sodium-activated calcium bentonite is added to the process mixture either before or after grinding. In case that it is added after the grinding, the pelletising feed can be homogenised with a mixer, preferably a twin-shell mixer.

Preferably, binding agent such as bentonite or sodium-activated calcium bentonite is added to the process mixture in an amount of 7-12 kg per tonne of chromite concentrate.

In the grinding circuit the process mixture is preferably wet ground. The wet grinding takes preferably place in a ball mill, more preferably in a ball mill in open circuit (without recycling). The purpose of grinding is to mill the process mixture to a particular particle size and obtain a specified particle size distribution, which is suitable for pelletising and for sintering.

Preferably, the process mixture is ground until the following particle size distribution is obtained:

| Sieve passing | Reference |
| --- | --- |
| 200 mesh (74 μm) | 80-82% |
| 300 mesh (53 μm) | 65-72% |
| 400 mesh (37 μm) | 50-58% |
| <1 μm | ≤2%, preferably ≤1% |

The mill is preferably an overflow type ball mill. Preferably, the slurry density during the grinding process is kept constant. The slurry density is preferably 2.15-2.25 kg/dm3 which corresponds to a solids content of 70-72 wt-%. Preferably, the mill power is measured during the grinding process. Usually, each process mixture has a specific grinding energy requirement (generally expressed as kWh/t) which has an influence on the feed rate and mill power. Preferably, grinding balls of specified size are added into the mill to obtain the required power input and the desired particle size distribution of the process mixture. The parameters can be optimised by adjusting the feed rate of the materials to be ground. Preferably, the oversize of >2 mm is filtered off after grinding.

The ground process mixture/pelletising feed is usually obtained in the form of slurry which is preferably dewatered after the grinding process.

In a preferred embodiment, ceramic filters such as capillary disc filters are used to dewater the slurry to obtain a filter cake. The moisture content of the filter cake is preferably 7-16 wt-%, more preferably 7-11 wt-%, even more preferably 8-10 wt-%, most preferably 8.5-9.7 wt-%, and in particular 9.3-9.7 wt.-%.

Typically, the capacity of each filter depends on the characteristics of the concentrate, process mixture and slurry (e.g., particle size distribution and temperature) and on the surrounding conditions like altitude. Preferably, the filters are run semi-continuously. Before the process mixture is entering the filtering process, it is preferably introduced to a slurry-mixing tank. Typically, the slurry-mixing tank works as a surge tank between the mill and the filters, and it can even balance deviations in the mill feed and operation, and it can thoroughly mix the slurry. The homogeneity of the slurry is important for the pelletising and sintering processes. Preferably, the agitation power of the tank is about 1 kW/m$^3$ to keep the slurry in proper suspension. Preferably, the agitator of the tank operates in such way that even the heavy chromite particles of 0.3 mm as well as lighter particles are kept in uniform suspension even in a full tank. The agitator is preferably equipped with a variable speed drive so that the agitation power can be controlled according to the slurry level in the tank.

Preferably, binding agent such as bentonite or sodium-activated calcium bentonite having a suitable particle size distribution is added to the filter cake after the filtering of the process mixture.

Preferably, the filter cake, binding agent (such as bentonite or sodium-activated calcium bentonite) and the optional fluxing agent are stored in proportioning bins. The filter-cake proportioning bins are preferably equipped with disc feeders to measure and control the feed of material to the mixing process. Usually, all feeders are used during normal operation to keep the material flowing in the proportioning bins. Preferably, screw feeders with weighing belts or loss-in-weight feeders are used for bentonite. Typically, each feed material (filter cake, bentonite and optional fluxing agent) is proportioned separately. The optional fluxing agent may be fed in proportion to the principal filter cake flow.

Usually, the proportioned materials (filter cake, bentonite and optional fluxing agent) are fed to a mixer and well mixed before pelletising. The mixer preferably contains a rotating mixing pan which is typically equipped with two high-speed rotors. Preferably, the level in the mixer is kept constant by controlling the opening of the discharge gate. Preferably, the mixer is kept as full as practicable (filling degree about 80%) for efficient mixing. Usually, the amount of required binding agent (e.g., bentonite or sodium-activated calcium bentonite) depends on the mixing power.

In a preferred embodiment, chromite is the only metal ore present; i.e., no other metal ore is added during the mixing process. In another preferred embodiment, the only carbonaceous material and reducing agent present is silicon carbide; i.e., no other reducing agent and carbonaceous material such as coal, char, coke or anthracite is added during the mixing process.

Preferably, the obtained mixture (pelletising feed) is provided to a pelletising drum to form pellets.

The invention further relates to the use of the pelletising feed according to the invention as a starting material for the manufacture of sintering feed, wherein the sintering feed is in the form of pellets.

Another aspect of the invention relates to a sintering feed in the form of pellets containing the pelletising feed according to the invention.

For the purpose of this description, the term "sintering feed" means the pellets, preferably green pellets (wet pellets), forming the starting material (raw material) for the manufacture of sintered pellets which takes place in the sintering furnace (sintering plant); the sintered pellets serve as starting material (smelting feed) for the smelting process to obtain FeCr, preferably FeCrNi.

Preferably, the sintering feed according to the invention contains chromite as the only metal ore; i.e., the sintering feed does not contain any other metal ore but chromite ore. In another preferred embodiment, the sintering feed according to the invention contains SiC as the only carbonaceous material and the only reducing agent; i.e., the sintering feed does not contain any other carbonaceous material and reducing agent but SiC.

SiC is contained in the pellets (sintering feed) because said SiC is a component of the pelletising feed from which the pellets are obtained. The SiC contained in the pellets is herein also referred to as "internal reducing agent".

In a preferred embodiment, the sintering feed in the form of pellets, preferably green pellets (wet pellets), consists of the pelletising feed according to the invention.

With respect to the sintering feed according to the invention, the term "consist of" means that the sintering feed consists of the pelletising feed only and, hence, the presence of any additional component is excluded. In other words, the pelletising feed according to the invention amounts to 100%. Hence, the pellets contain SiC as the only carbonaceous material and the only reducing agent.

The sintering feed according to the invention has a pellet size of preferably 8-16 mm, more preferably 10-14 mm, even more preferably 12±1 mm, and most preferably 12 mm.

The sintering feed according to the invention is preferably in the form of a green pellet (wet pellet). The pellets can also be in the form of dried pellets or in form of any mixture containing green pellets (wet pellets) and dried pellets. However, sintering feed is typically in the form of green pellets (wet pellets).

The moisture content of the green pellets is preferably 7-16 wt-%, more preferably 7-11 wt-%, even more preferably 7-10 wt-%, most preferably 8-10 wt-%, and in particular 9-10 wt-%.

The compressive strength of the green pellets is preferably 1-3 kg/pellet, more preferably 1.2-2.8 kg/pellet, and even more preferably 1.2-2.1 kg/pellet.

The compressive strength of the dried pellet is preferably 5-15 kg/pellet, more preferably 5.5-14 kg/pellet, and even more preferably 7-14 kg/pellet. Typically, the dried pellets are obtained by drying the green pellets to constant weight in a cabinet dryer, preferably at elevated temperature (e.g. 100-150° C.) and atmospheric pressure, negative pressure or vacuum.

The density of the dried pellets is preferably 3±1 g/cm³, more preferably 2.8 to 3.4 g/cm³, even more preferably 3 to 3.3 g/cm³, and most preferably 3 to 3.25 g/cm³.

Another aspect of the invention relates to a process for manufacturing the sintering feed according to the invention comprising the step feeding of the pelletising feed according to the invention to a pelletising drum.

The discharge from the pelletising drum is preferably screened in a roller screen located under the discharge end of the pelletising drum. Usually, the oversize lumps are crushed and returned with the screen undersize as a recycling load back to the pelletising drum. Green pellets of the desired size are preferably dropped on a belt conveyor feeding to the shuttle feeder of the sintering furnace. The rates of product green pellets and recycling fines can be weighed. In normal operation the recycling load is preferably about two and a half times that of the product.

The invention further relates to the use of the sintering feed according to the invention as starting material for the manufacture of sintered pellets.

Another aspect of the invention relates to sintered pellets containing the sintering feed according to the invention.

In a preferred embodiment, the invention relates to sintered pellets derived from the sintering feed according to the invention.

Preferably, the sintered pellets consist of the sintering feed according to the invention; i.e., the sintered pellets are derived from the sintering feed according to the invention only; in other words, the amount of sintering feed (green pellets) represents 100% of the sintered pellets.

Preferably, the sintered pellets according to the invention contain chromite ore as the only metal ore; i.e., the sintering feed does not contain any other metal ore but chromite ore. In another preferred embodiment, the sintered pellets according to the invention contain SiC as the only carbonaceous material and the only reducing agent; i.e., the sintering feed does not contain any other carbonaceous material and reducing agent but SiC.

SiC is contained in the sintered pellets because said SiC is a component of the sintering feed from which the sintered pellets are obtained. The SiC contained in the sintered pellets is herein also referred to as "internal reducing agent".

Due to the sintering conditions, the component SiC can undergo oxidation as the green pellets (sintering feed) are sintered. According to the invention, the sintered pellets still contain SiC after completion of the sintering process. In other words, the SiC present in the green pellets (sintering feed) is only partially oxidised during the sintering process.

The sintered pellets according to the invention contain preferably ≥25%, more preferably ≥30%, even more preferably ≥40%, most preferably ≥50%, and in particular ≥60% residual carbon.

In another preferred embodiment, the sintered pellets contain preferably 10-100%, more preferably 20-100%, still more preferably 30-100%, still more preferably 40-100%, most preferably 50-100%, and in particular 60-100% residual carbon. The sintered pellets may also contain 70-100%, 80-100%, 90-100% or even 95-100% residual carbon.

For the purpose of this description, the term "residual carbon" means the percentage of oxidisable carbon left in the sintered pellets in relation to the initial amount of carbon present in the sintering feed or pelletising feed. It can be calculated according to the following formula:

$$[C]_R = [C]_S / [C]_F * 100\%, \text{ where}$$

$[C]_R$: residual carbon;
$[C]_S$: amount [wt-%] of carbon in the sintered pellets;
$[C]_F$: amount [wt-%] of carbon in the pelletising feed or sintering feed.

The sintered pellets according to the invention contain preferably ≥25%, more preferably 30%, even more preferably ≥40%, most preferably 50%, and in particular ≥60% residual SiC.

In another preferred embodiment, the sintered pellets contain preferably 10-100%, more preferably 20-100%, still more preferably 30-100%, still more preferably 40-100%, most preferably 50-100%, and in particular 60-100% residual SiC. The sintered pellets may also contain 70-100%, 80-100%, 90-100% or even 95-100% residual SiC.

For the purpose of this description, the term "residual SiC" means the percentage of SiC left in the sintered pellets in relation to the initial amount of SiC present in the sintering feed or pelletising feed. It can be calculated according to the following formula:

$$[SiC]_R \alpha [SiC]_S / [SiC]_F * 100\%, \text{ where}$$

$[SiC]_R$: residual SiC;
$[SiC]_S$: amount [wt-%] of SiC in the sintered pellets;
$[SiC]_F$: amount [wt-%] of SiC in the pelletising feed or sintering feed.

The total porosity of the sintered pellets is preferably 15-55 vol-%, more preferably 20 to 50 vol-%, even more preferably 30 to 48 vol-%, most preferably 34-45 vol-%, and in particular 35.5-41.5 vol-%.

The sintered pellets have a pellet size of preferably 8-16 mm, more preferably 10-14 mm, even more preferably 12±1 mm, and most preferably 12 mm.

The compressive strength of the sintered pellets is preferably 200 kg/pellet expressed as $F_{12mm}$. The compressive strength $F_{12mm}$ can be calculated according to the following formula:

$$F_{12mm} = (12/D)^2 * F_D, \text{ where}$$

D: measured diameter of the pellet [mm];
12: reference diameter of the desired pellet [mm];
FD: the measured compressive strength of the pellet [kg/pellet].

The abrasion resistance of the sintered pellets measured after 8 minutes is preferably 2-8%≤5 mm and 2-8%≤0.59 mm, more preferably 3-7%≤5 mm and 3-7%≤0.59 mm, even more preferably 4-6%≤5 mm and 4-6%≤0.59 mm, most preferably 4.5-5.5%≤5 mm and 4.5-5.5%≤0.59 mm, and in particular 4.9%≤5 mm and 4.9%≤0.59.

The abrasion resistance of the sintered pellets measured after 32 minutes is preferably 5-11%≤5 mm and 5-11%≤0.59 mm, more preferably 6-10%≤5 mm and 6-10%≤0.59 mm, even more preferably 7-9%≤5 mm and 7-9%≤0.59 mm, most preferably 7.5-8.5%≤5 mm and 7.5-8.5%≤0.59 mm, and in particular 7.8%≤5 mm and 7.8%≤0.59 mm.

The abrasion resistance of the sintered pellets measured after 90 minutes is preferably 10-16%≤5 mm and 10-16%≤0.59 mm, more preferably 11-15%≤5 mm and 11-15%≤0.59 mm, even more preferably 12-14%≤5 mm and 12-14%≤0.59 mm, most preferably 12.5-13.5%≤5 mm and 12.5-13.5%≤0.59 mm, and in particular 12.8%≤5 mm and 12.8%≤0.59 mm.

The abrasion resistance is measured in accordance to the modified Tumbler Test.

The true density of the sintered pellets is preferably 3-5 g/cm$^3$, more preferably 3.5-4.5 g/cm$^3$, and most preferably 3.8-4.1 g/cm$^3$.

The closed porosity of the sintered pellets is preferably 7-10%, more preferably 8-9%, and most preferably 8.4%.

The volume weight of the sintered pellets according to the invention is preferably 1 to 3 g/cm$^3$, more preferably 1.4 to 2 g/cm$^3$, and most preferably 1.8 g/cm$^3$.

The roller angle of the sintered pellets according to the invention is preferably 20-40°, more preferably 25-35°, even more preferably 28-32°, and most preferably 29.5°.

The hot loading temperature of the sintered pellets is preferably 1218° C. T-1%, 1263° C. T-2%, 1292° C. T-3%, 1313° C. T-4%, 1330° C. T-5%.

In a preferred embodiment, a shrinkage of 5% occurred in the range of 1330 to 1350° C., which is an optimal value for smelting.

The sintered pellet is characterised by a metallisation of chrome of preferably <5%, more preferably <4%, still more preferably <3%, still more preferably <2%, most preferably <1%, and in particular <0.5% with respect to the initial total amount of chrome in the chromite ore.

The sintered pellet contains preferably <1 wt-%, more preferably <0.75 wt-%, even more preferably <0.5 wt-%, most preferably <0.25, and in particular <0.2 wt-% metallic chrome.

The sintered pellet is characterised by a metallisation of iron of preferably <35%, more preferably <30%, even more preferably <25%, most preferably <21%, and in particular <15%.

The sintered pellet according to the invention contains preferably <10 wt-%, more preferably <7.5 wt-%, even more preferably <5 wt-%, most preferably <4 wt-% and in particular <3.7 wt-% metallic iron.

The invention further relates to a process for manufacturing the sintered pellets according to the invention comprising the step
heating the sintering feed to induce sintering.

In a preferred embodiment, the process according to the invention comprises the step
feeding the sintering feed (green pellets) to a sintering furnace.

In another preferred embodiment, the process according to the invention comprises the step
feeding the sintering feed (green pellets) to a steal belt of a sintering furnace.

The steal belt is preferably used as an endless conveyor belt to transport the sintering feed through the stages of the sintering furnace. This process is also known as Outotec's steel belt sintering process (SBS).

The sintering feed is heated to a maximum sintering temperature of preferably 1250-1500° C., more preferably 1300-1450° C., and most preferably 1350-1420° C.

The sintering furnace is preferably a multicompartment oven through which the green pellets are carried on a perforated steel conveyor belt. Preferably, a counter-current flow of cooling gases carries waste heat from sintered pellets to those entering the front-end compartments. Typically, gases are sucked and cooling air blown through wind-boxes located under the conveyor belt. Preferably, sintered pellets (sized product pellets) are used as bottom layer on the steel belt to protect it from too high temperatures.

The pellets forming the bottom layer can be fed to the conveyor belt from a bottom-layer feed bin located at the feed-end of the sintering furnace. The thickness of the bottom layer is preferably 180-250 mm; the thickness typically depends on the feed rate and experience of the operators. The bottom layer may be even thicker than 250 mm, e.g. during commissioning and heating-up phases.

Preferably, the green pellets are fed to the sintering furnace by a feeding system consisting of a shuttle feeder and a roller feeder provided with a wide feeder belt. The roller feeder preferably spreads the pellets onto the bottom layer pellets and the system is preferably adjusted to form the green pellet bed to the sintering furnace. Total bed thickness of the bottom layer and green pellet layer is preferably fixed to 400-500 mm, more preferably 450 mm. The thickness of the green pellet bed may depend on the respective bottom layer. The nominal thickness for the green pellet layer is thus preferably about 250 mm.

Preferably, the conveyor belt (e.g., steel belt) transports the pellets to be sintered through the different stages of the sintering process in the sintering furnace, as outlined here below.

The sintering furnace typically comprises a drying compartment as the first stage. In the drying compartment, hot gas which is preferably re-circulated from the third cooling zone can be sucked through the bed and, as a consequence, the bed starts to dry. The temperature of the drying gas is preferably 320-400° C. Said temperature may be controlled by adjusting the cooling-air flow through the third cooling zone. Typically, extra recycle gas is conducted to bypass the drying compartment. Preferably, a bypass damper located in the bypass line is used for the temperature control.

The sintering furnace typically further comprises a heating compartment as the second stage. In the heating compartment, hot gas which is preferably re-circulated from the second cooling zone is usually sucked through the bed to increase the bed temperature. The bed is preferably heated to a temperature that the carbon (stemming from SiC) in the green pellet bed ignites to commence sintering reactions. The temperature of the heating gas is preferably 1050-1150° C. Preferably, the heat is obtained by burning fuel gas in a burner located in the circulating gas duct.

Further, the sintering furnace typically comprises a sintering compartment as the third stage to obtain sintered pellets. In the sintering compartment, hot gas which is preferably circulated from the first cooling zone is usually sucked through the bed. The temperature of the bed is preferably increased to the sintering temperature, which depending on the mineralogy may be 1250-1500° C. The temperature of the sintering gas is preferably 1250-1500° C., more preferably 1300-1450° C., and most preferably 1350-1420° C. Preferably, the heat necessary for the sintering stage is obtained by burning fuel gas in a burner like in the heating stage.

Preferably, the process gases are separately taken out from each front-end zone to control the sintering temperature, pressure and gas flow profiles in the sintering furnace. Typically, the gases are cleaned in wet (e.g., cascade type) scrubbers. The gas flows may be adjusted by controlling (e.g., manually controlling) the speed of the off-gas fans.

In a preferred embodiment, the sintered pellets are cooled in several consecutive cooling compartments. The sintered pellets are preferably cooled by blowing air through the bed from below the belt. Preferably, the sintering furnace comprises or consists of three cooling departments. The cooling gases may be circulated to the front-end compartments. Typically, air is blown separately to each wind-box according to the pressure settings in the compartments over the bed. The sintering reactions usually still continue—at least partially—in the cooling zones to further strengthen the product pellets.

Typically, fresh sintered pellets according to the invention are discharged together with bottom layer pellets and preferably transported on the conveyor belt (e.g., steel belt) to screening and pellet bins. In case that upset conditions are implemented, pellets are preferably taken out on a stockpile by a divider chute before entering the bins. Typical upset conditions may include emergency cooling situations during start-up due to imbalance in the temperature profile, or generally due to crush in the bed or too much burning carbon in pellets. Typically, the produced pellets are screened to a maximum particle size of 6 mm (i.e., screened to +6 mm) and fed to fill the bottom layer feed bin at the front end of the sintering machine. The final product pellets (smelting feed) may be screened to a maximum particle size of about 2 or 6 mm (i.e., screened to a particle size of about +2/+6 mm) and are then typically conveyed to smelters.

Another aspect of the invention relates to the use of the sintered pellets according to the invention as a component of smelting feed.

Preferably, the sintered pellets according to the invention are used as a starting material for the manufacture of ferrochrome alloy, preferably ferrochromium nickel alloy.

Another aspect of the invention relates to smelting feed comprising the sintered pellets according to the invention and further comprising external reducing agent.

For the purpose of the description, the term "external reducing agent" means any reducing agent which is added to the sintered pellets to obtain the smelting feed. Contrary to the "internal reducing agent" SiC which is a component of the sintered pellets, the "external reducing agent" is not a component of the sintered pellets.

The external reducing agent is preferably a compound which serves as a source of elemental carbon. In another preferred embodiment, the external reducing agent is coke (e.g., metallurgical coke), char, anthracite or carbide or any mixture thereof. In another preferred embodiment, the external reducing agent is selected from the group consisting of coke, char and anthracite or it is any mixture thereof.

Typically, coal is difficult to use because it may form tar in the preheating kiln and in the closed smelting furnace. The same problem may occur with anthracite. The tar may block the preheating kiln and gas lines. Hence, the availability of the preheating kiln may be higher if coal or anthracite is not used, and coke or metallurgical coke or any mixture thereof is preferred over other carbonaceous material as suitable external reducing agents. The metallurgical coke has preferably a high level of fixed carbon.

In a preferred embodiment, the external reducing agent is coke such as metallurgical coke and the smelting feed does not contain any other external reducing agent but coke such as metallurgical coke.

The external reducing agent has a particle size of preferably 100%<2.5-5 mm, more preferably 100%≤297 µm.

The smelting feed contains preferably <220, more preferably <210, and even more preferably 150-210, most preferably 160-210, and in particular 169-207 units of external reducing agent per 1000 pellets units. The smelting feed contains preferably <220, more preferably <210, and even more preferably 150-210, most preferably 160-210, and in particular 169-207 units of coke, preferably metallurgical coke, per 1000 pellets units.

In another embodiment, the smelting feed according to the invention further comprises at least one fluxing agent as defined herein above. Preferably, fluxing agents are quartzite or calcite or any mixture thereof. Also other fluxing agents such as limestone, dolomite, quarts, or wollastonite or any mixture thereof may be used depending on the ratio of slag forming components in the ore.

Preferably, the silica content of the fluxing agent such as quartzite is high. In a preferred embodiment, the quality is such that it can be heated without disintegration. The smelting is preferably based on acid slag. Some limestone or dolomite may be added for fine-tuning of the slag chemistry.

The particle size of quartzite and calcite is preferably <5 mm, more preferably less than 2-5 mm.

The smelting feed contains preferably 20-80 quartzite units, more preferably 30-70, even more preferably 40-60 quartzite units, most preferably 45-quartzite units and in particular 49 quartzite units per 1000 pellets units. The smelting feed contains preferably 41 calcite units per 1000 pellet units. In another embodiment, the smelting feed contains 49 quartzite units per 1000 pellets units and 41 calcite units per 1000 pellet units.

The smelting feed according to the invention may further comprise lumpy ore, preferably lumpy chromite ore. In a preferred embodiment, however, the smelting feed according to the invention does not comprise any lumpy ore additives.

Another aspect of the invention relates to a process for manufacturing ferrochrome alloy, preferably ferrochromium nickel alloy, comprising the step
smelting the smelting feed according to the invention.

The smelting process is preferably conducted in a closed and sealed submerged arc furnace, using the sintered pellets according to the invention, small amounts of external reducing agent; optional components of the smelting feed are fluxing agents and lumpy ore. The smelting feed is preferably preheated in a shaft kiln located above the smelting furnace. Typically, the furnace gas is cleaned in two venturi scrubbers and in CO-filters. CO-gas which is produced during the smelting process may be used as in preheating and sintering processes.

The high rate ferrochromium production technology described herein is based on using the sintered chromite pellets according to the invention in the smelting. The composition of the sintered pellet according to the invention is advantageous for smelting because of its SiC and nickel salt content.

Preferably, the raw materials are the sintered pellets according to the invention, optionally lumpy ore, small amounts of coke as external reducing agent, and quartzite for fluxing. Also other fluxing agents may be used depending on the ratio of slag forming components in the ore.

Preferably, high-quality coke such as metallurgical coke is chosen as external reducing agent. Metallurgical coke is preferably characterised by high fixed carbon content. Typically, coal and anthracite should not be used in the smelting process because of the formation of tar in the preheating kiln and in the closed smelting furnace which may block the preheating kiln and gas lines. Typically, the strength of the coke is important so that it can be fed through the preheating kiln and feeding systems without disintegration. Preferably, the coke is dried before dosing to ensure accurate dosing.

In a preferred embodiment, the raw materials are fed directly to day bins or stored in covered storages. The day bins are preferably located outside the smelting plant. The raw materials may be fed by an automatic batching system on a collecting belt and lifted to the kiln feed bin. Typically, the batching system is crucial for controlling the feeding of the smelting feed to the smelting process: it has to be accurate and reliably operating. Preferably, all material corrections for smelting are made in the dosing station before preheating. Typically, the process after dosing takes place in a closed system. The dosing system is preferably based on batching the feed materials according to the recipe: each component in the batch is weighed and excess material or shortages are corrected in the following batch.

Typically, the purpose of preheating is to eliminate the moisture from the feed charge mixture, and to calcinate and preheat it to as high a temperature as possible without burning of coke. The carbon eating reactions, especially the Boudouard reaction $C(s)+CO_2(g) \rightarrow 2CO(g)$, is usually the limiting factor. The preheating temperature in the shaft kiln may locally be at a maximum of 650-700° C. depending on the reactivity of the coke, but the average temperature of the hot charge is typically about 450-550° C. The thermal power in preheating during normal operation is usually about 8-11 MWh/h.

In general, preheating decreases the electrical energy consumption in the smelting process, but it also increases the CO content of the furnace gas and stabilizes the resistance of the burden. Typically, preheating improves the operation, production and safety of the smelting.

Typically, the preheating takes place in a shaft kiln—preferably a steel silo—located above the smelting furnace. The kiln preferably comprises a refractory lining. The lower part of the silo is preferably divided into hoppers feeding the material to the respective charging tubes. The gas distribution system inside the silo is typically formed by refractory. The combustion chamber is preferably connected to the gas distribution chamber. The smelting feed according to the invention is preferably fed from the kiln feed bin to the preheating kiln semi-continuously by two vibrating feeders. The kiln may be provided with a rotating distributing device, which distributes the charge material into the sections. Every section preferably comprises a level indicator to control the material level in the kiln. Typically, the material flows freely through the charging tubes to the smelting furnace. The material in the tubes and in the silo preferably forms a gas seal between the gas spaces in the furnace and in the kiln.

Typically, smelting is carried out in a submerged arc furnace which is preferably equipped with three electrodes. The preheated feed usually forms a burden around the electrode tips. Typically, the reducing agents reduce chromium, iron and nickel to FeCrNi and other components form the slag. The heavier liquid metal usually settles on the bottom of the furnace and the slag typically forms a layer over the metal. The smelting temperature and the viscosity of the slag may be adjusted by the use of fluxing agents such as quartzite. The formed FeCrNi and slag may be tapped intermittently (preferably every 2-2½ hours) from the furnace through a common tap hole.

Preferably, the smelting furnace is closed with a flat roof. The roof may comprise water cooled elements and refractory material. Typically, the furnace is sealed so that there is no gas burning in the furnace or no leakage to the surroundings. A CO fan may be used to control the pressure in the furnace under the roof to atmospheric level to avoid leakages.

The electrode system is preferably a type of self-baking Söderberg electrodes. Special type dry seals are typically used in electrode openings.

In a preferred embodiment, three one-phase furnace transformers are used for supplying electricity to the electrodes. Electrodes are connected to the transformers by water-cooled copper tubes. The transformers are preferably equipped with tap changers for controlling the secondary voltage to the furnace.

The furnace is usually provided with refractory lining and open-water-cooled steel shell. The furnace bottom is preferably cooled with an air fan. The specific energy consumption in smelting is usually dependent on the raw material quality. The sintered pellets according to the invention are high quality feed that gives stabilized smelting conditions and high recovery and small energy consumption. The lumpy ore, which may be optionally mixed with the pellets according to the invention should also be preferably of high quality. With increasing amount of fines and dust the operation becomes unbalanced, which results in decreased power input and thus decreased production. The pellets according to the invention mixed with high quality lumpy ore allow high operational efficiency and large production units can be used.

Another embodiment of the invention relates to ferrochrome alloy, preferably ferrochromium nickel alloy, obtainable by the smelting process according to the invention.

The invention claimed is:

1. Pelletizing feed comprising:
   chromite ore,
   at least one nickel salt, and
   silicon carbide as the only carbonaceous material and the only reducing agent.

2. The pelletizing feed according to claim 1, wherein the pelletising feed contains 4-20 wt-% silicon carbide.

3. The pelletizing feed according to claim 2 wherein the pelletizing feed further comprises a binding agent.

4. The pelletizing feed of claim 2, where said pelletizing feed is contained in sintering feed in the form of pellets.

5. The pelletizing feed according to claim 1, wherein the pelletising feed further comprises a binding agent.

6. The pelletizing feed of claim 1, where said pelletizing feed is contained in sintering feed in the form of pellets.

7. The pelletizing feed of claim 6 where said sintering feed comprises sintered pellets.

8. The pelletizing feed of claim 7, wherein the $F_{12mm}$ compressive strength of the sintered pellets is ≥200 kg/pellet.

9. A method comprising the steps of:
   providing chromite ore, at least one nickel salt, and silicon carbide as the only carbonaceous material and the only reducing agent; and
   mixing said chromite, said at least one nickel salt, and said silicon carbide to make pelletizing feed.

10. The method of claim 9 including the step of using the pelletizing feed to make sintering feed in the form of pellets.

11. The method of claim 10 including the step of feeding the pelletizing feed into a preliminary drum.

12. The method of claim 10 including the step of heating the sintering feed to induce sintering.

13. The method of claim 12 where the $F_{12mm}$ compressive strength of the sintered pellets is ≥200 kg/pellet.

14. The method of claim 12 including the step of using sintered pellets to form smelting feed.

15. The method of claim 14 where the $F_{12mm}$ compressive strength of the sintered pellets is ≥200 kg/pellet.

16. The method of claim 14 including the step of smelting the smelting feed to form a ferrochrome alloy.

* * * * *